United States Patent
Harvey et al.

(10) Patent No.: US 7,070,705 B2
(45) Date of Patent: *Jul. 4, 2006

(54) FIBER-REINFORCED ROCKET MOTOR INSULATION

(75) Inventors: Albert R. Harvey, Brigham City, UT (US); John W. Ellertson, Brigham City, UT (US)

(73) Assignee: Alliant Techsystems Inc., Edina, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/772,877

(22) Filed: Feb. 5, 2004

(65) Prior Publication Data

US 2004/0157979 A1 Aug. 12, 2004

Related U.S. Application Data

(63) Continuation of application No. 10/046,132, filed on Jan. 9, 2002, now Pat. No. 6,691,505.

(60) Provisional application No. 60/260,704, filed on Jan. 10, 2001.

(51) Int. Cl.
*F16L 59/00* (2006.01)

(52) U.S. Cl. ............... 252/62; 524/571; 524/575.5
(58) Field of Classification Search ............. 252/62; 524/571, 575.5
See application file for complete search history.

(56) References Cited

U.S. PATENT DOCUMENTS

| | | |
|---|---|---|
| 3,686,868 A | 8/1972 | Chase et al. |
| 3,973,397 A | 8/1976 | Chase et al. |
| 4,504,532 A | 3/1985 | Herring |
| 4,649,701 A | 3/1987 | Wendel |
| 4,663,065 A | 5/1987 | Herring |

(Continued)

FOREIGN PATENT DOCUMENTS

| | | | |
|---|---|---|---|
| JP | 8-127674 | * | 5/1996 |
| WO | WO 01/04198 | | 7/2000 |
| WO | WO 01/20966 A2 | | 3/2001 |
| WO | WO 01/46279 A1 | | 6/2001 |

OTHER PUBLICATIONS

Darmstadt, H., 1997, Elsevier Science Ltd., Effects of Surface Treatment on the Bulk Chemistry and Structure of Vapor Grown Carbon Fibers, p. 1581, 5 pages.

Ibarra et al., "The Effect of Oxidized Carbon Fibre Content on the Properties of Thermal Plastic Elastomer Composites," Kautschuk and Gummi—Kunststoffe, Dr. Alfred Huthig Verlag Gmbh; Heidelberg, DE; vol. 50, No. 6, Jun. 1, 1997, pp. 478–480, 482, 484.

Libera, Joseph, et al., 2001, Pergamon, Hydrothermal synthesis of graphite tubes using Ni catalyst, pp. 1308 & 1317, 12 pages.

Patton et al., "Vapor Grown Carbon Fiber Composites with Epoxy and Poly(Phenylene Sulfide) Matrices," Composites Part A: Applied Science and Manufacturing; Elsevier Science Publishers B.V.; Amsterdam, NL; vol. 30, No. 9; Sep. 1999; pp. 1081–1091.

(Continued)

*Primary Examiner*—C. Melissa Koslow
(74) *Attorney, Agent, or Firm*—TraskBritt (57) ABSTRACT

Insulation for a rocket motor is provided, as is a method for insulating a rocket motor. The insulation includes a cured elastomer and vapor-grown carbon fibers dispersed in the cured elastomer. The cured elastomer is preferably formed from a precursor composition comprising an EPDM terpolymer. Generally, the vapor-grown carbon fibers have an internal graphitized tube surrounded by a sheath of vapor-deposited amorphous carbon.

28 Claims, 3 Drawing Sheets

U.S. PATENT DOCUMENTS

| | | | |
|---|---|---|---|
| 4,711,086 A | | 12/1987 | Offe et al. |
| 4,878,431 A | | 11/1989 | Herring |
| 4,953,476 A | | 9/1990 | Sayles |
| 4,956,397 A | | 9/1990 | Rogowski et al. |
| 5,024,818 A | | 6/1991 | Tibbetts et al. |
| 5,024,860 A | | 6/1991 | Chang |
| 5,352,312 A | | 10/1994 | Guillot |
| 5,374,415 A | | 12/1994 | Alig et al. |
| 5,409,775 A | * | 4/1995 | Harada et al. ............... 428/367 |
| 5,547,525 A | | 8/1996 | Bennett et al. |
| 5,594,060 A | | 1/1997 | Alig et al. |
| 5,767,221 A | | 6/1998 | Poulter et al. |
| 5,821,284 A | | 10/1998 | Graham et al. |
| 5,830,384 A | | 11/1998 | Stephens et al. |
| 5,989,459 A | * | 11/1999 | Nguyen et al. ............. 252/503 |
| 6,691,505 B1 | * | 2/2004 | Harvey et al. ................ 60/253 |

OTHER PUBLICATIONS

Hill, Jeanene Renee, "Usage of Vapor Grown Carbon Fiber Composite with Phenolic Matrix in the Space Shuttle Usable Solid Rocket Motor Nozzle," Online!: May 13, 1999, Mississippi State University, Retrieved from the Internet: < URL: http://www.me.msstate.edu/STUDENT/ThesisHill.htm> Retrieved on Mar. 14, 2003.

Pennwalt, "Dialkyl Peroxides".

Sutton, G.P., "Rocket Propulsion Element," 1992, Wiley & Sons, New York, US, pp. 106–109.

Tarasen, William, et al., Pyrograf III VGCF Nanofibers for Engineered Composites, no date.

* cited by examiner

FIBER-REINFORCED ROCKET MOTOR INSULATION

CROSS-REFERENCE TO RELATED APPLICATIONS

This application is a continuation of application Ser. No. 10/046,132, filed Jan. 9, 2002, now U.S. Pat. No. 6,691,505, issued Feb. 17, 2004, which claims the benefit of priority of U.S. provisional application Ser. No. 60/260,704 filed Jan. 10, 2001, the complete disclosure of which is incorporated herein by reference.

BACKGROUND OF THE INVENTION

1. Field of the Invention

This invention relates to insulation materials and methods, for example, for internal and external insulating applications in rocket motors and, more particularly, to insulation having carbon fibrous components. The novel insulation of this invention is especially useful for insulating the interior surface of the casing of a solid propellant rocket motor, among other applications.

2. State of the Art

Although there are many variations to the configuration and construction of a rocket motor, rocket motors generally comprise an outer motor casing for housing an energetic fuel or propellant. In the case of a solid rocket motor, the outer motor casing houses a solid propellant formulated to undergo combustion while contributing to the production of adequate thrust for attaining propulsion of the rocket motor. Other types of rocket motors, such as hybrid motors, reverse-hybrid motors, and biliquid motors, make use of a liquid fuel and/or oxidizer. A rubber insulation layer and a liner protect the rocket motor casing from high temperature while the propellant burns.

Rocket motor casings are generally made of metal, a composite material, or a combination of metal and composite materials. Composite materials are typically prepared by winding a resin-impregnated fiber on a mandrel to shape the rocket motor casing. The resin may be any suitable type of curable resin, including, for example, an epoxy resin or a phenolic resin where the fibers are, for example, aramid fibers.

During operation, a heat-insulating layer or layers (insulation) protects the rocket motor casing from thermal effects and erosive effects of particle streams generated by combustion of the propellant. Typically, the insulation is bonded to the interior surface of the casing and is generally fabricated from a composition that, upon curing, is capable of enduring the high temperature gases and erosive particles produced while the propellant grain burns. A liner layer (liner) functions to bond the propellant grain to the insulating layer and to any noninsulated interior surface portions of the casing. Liners also typically have an ablative function, inhibiting burning of the insulation at liner-to-insulation interfaces. A number of liner compositions are generally known to those skilled in the art. An exemplary liner composition and process for applying the same is disclosed in U.S. Pat. No. 5,767,221.

The combustion of a solid rocket propellant generates extreme conditions within the rocket motor casing. For example, temperatures inside the rocket motor casing can reach 2,760° C. (5,000° F.). These conditions, along with the restrictive throat region provided along the nozzle passageway, combine to create a high degree of turbulence within the rocket motor casing. In addition, the gases produced during propellant combustion typically contain high-energy particles that, under a turbulent environment such as encountered in a rocket motor, can erode the rocket motor insulation. If the propellant penetrates through the insulation and liner, the casing may melt or otherwise be compromised, causing the rocket motor to fail. Thus, it is crucial that the insulation withstands the extreme conditions experienced during propellant combustion and protects the casing from the burning propellant.

In the past, candidates for making rocket motor insulation have included filled and unfilled plastics or polymers, such as phenolic resins, epoxy resins, high temperature melamine-formaldehyde coatings, as well as ceramics, polyester resins, and the like. Plastics, however, tend to crack and/or blister in response to the rapid heat and pressure fluctuations experienced during rocket motor propellant combustion.

Rubbers or elastomers have also been used as rocket motor insulation materials in a large number of rocket motors. Cured ethylene-propylene-diene monomer ("EPDM") terpolymer is a specifically advantageous rubber used alone or in blend and is often selected because of its favorable mechanical, thermal, and ablative properties. However, in high velocity environments, the ablative properties of elastomers are sometimes inadequate for rocket motor operation unless the elastomers are reinforced with suitable fillers. The criticality of avoiding high erosion rates is demonstrated by the severity and magnitude of risk of failure due to erosion. Most insulation is, of necessity, "man-rated" in the sense that a catastrophic failure can result in the loss of human life. The monetary cost of failure in satellite launches is well publicized. Additionally, the tensile strength and tear strength of unfilled elastomers may not be sufficiently high to withstand and endure the mechanical stresses that the elastomer is subjected to during processing.

It is known in the art to load elastomeric (e.g., cured EPDM) insulation materials with fillers, such as carbon fibers and/or silica, to improve the ablative and physical properties of the insulation.

Current silica-filled elastomeric insulation materials are electrically insulating, exhibiting high volume resistivities and, hence, a poor ability to dissipate static charge. The ability to dissipate static charge is considered to be an important quality for the thermal insulator. An insulator possessing this quality is able to bleed off or dissipate charges that build up on the insulator surface. An insulator having a high electrical resistivity does not dissipate static charge timely, thus creating a potential for static charge to build up to a dangerous level. When the electric field increases to the point that breakdown of the air occurs or a path to ground for the static charge is inadvertently provided, the discharge can be dangerous. Physical harm to personnel and flash fires are possible. Conventional silica-filled EPDM insulation is electrically insulating, having resistivities ranging from $1\times10^{14}$ to $1\times10^{16}$ Ohm·cm. An insulator is considered to be able to dissipate static charge if its volume resistivity is in the range of from $1\times10^5$ to $1\times10^{12}$ Ohm·cm. Asbestos-filled NBR, which is one of the few currently used insulation materials that is considered to be able to dissipate static charge, has a volume resistivity in the range of $1\times10^{11}$ to $1\times10^{12}$ Ohm·cm. However, the use of asbestos in rocket motors has lost favor due to reported health dangers associated with asbestos.

Conventionally, carbon fiber filler used in elastomeric insulation is prepared from spun organic fiber, which is graphitized and cut to desirable dimensions. An example of a rocket motor insulation composed of EPDM (NORDEL® 1040) as the primary terpolymer is commonly known in the industry as STW4-2868 thermal insulation and has approximately the following composition:

| Ingredient | Function | Parts by Weight |
|---|---|---|
| NORDEL® 1040 | Primary EPDM Terpolymer base | 80 |
| Neoprene FB | Secondary polymer base | 20 |
| Zinc oxide | Activator | 5 |
| Sulfur | Curative | 1 |
| HAF carbon black | Pigment | 1 |
| MBT | Accelerator | 1 |
| AGERITE® Resin D | Antioxidant | 2 |
| Acerite HPS | Antioxidant | 1 |
| Tellurac | Accelerator | 0.50 |
| Sulfads | Accelerator | 0.75 |
| VCM carbon fibers | Filler | 41 |
| Total parts by weight | | 153.25 |

Although many organic-based fibers can be dispersed in the EPDM without too much difficulty, the homogeneous dispersion of carbon fibers in EPDM presents a difficult processing problem. Specifically, the mixing process is complicated by the fragility of the carbon fibers. Mixing carbon fibers into a solid elastomer under high shear physically deteriorates the carbon fibers into smaller particles or shreds, thereby negating the advantageous physical attributes that the carbon fibers would otherwise have contributed to the insulation.

Conventionally, the problem of carbon fiber fragility has been addressed by dissolving the polymer binder into solution with an appropriate organic solvent to lower the viscosity of the polymer. Suitable solvents include hydrocarbons such as hexane, heptane, and cyclohexane. The frangible graphitized carbon fibers can then be mixed with the solution in, for example, a sigma-blade mixer without significant breakage of or damage to the carbon fibers. The material is then sheeted out and the solvent is allowed to evaporate at ambient atmosphere or in an oven.

The use of solvent in this processing technique presents several drawbacks. For example, solvent-processing techniques, such as those conventionally used to disperse carbon fibers in EPDM terpolymer, are relatively expensive. Material costs are increased by the use of solvents, as are processing costs, since additional workers and special equipment are required to handle and process the solvents. Further, considerable costs and worker safety issues are associated with the disposal of hazardous volatile organic solvents.

BRIEF SUMMARY OF THE INVENTION

This invention provides a carbon fiber-filled rocket motor insulation having good insulating properties that can be prepared via a relatively low cost and nonhazardous solvent-free synthesis route without subjecting the carbon fibers to significant breakage or damage.

A rocket motor is also provided which comprises a rocket motor casing comprising a combustion chamber, a propellant contained in the casing and formulated to generate combustion products upon ignition, and a nozzle assembly. The nozzle assembly has a restrictive throat and an exit region and is operatively engaged with the rocket motor case to receive the combustion products and to pass the combustion products through the throat before discharging the combustion products from the exit region. Insulation is arranged internally in or externally on the rocket motor casing and/or the nozzle assembly for insulating or heat shielding. The insulation comprises a cured elastomer and vapor-grown carbon fibers dispersed in the cured elastomer. The cured elastomer is preferably formed from a precursor composition comprising an EPDM terpolymer.

The vapor-grown carbon fibers have an internal graphitized tube surrounded by a sheath of vapor-deposited amorphous carbon. It has also been found in currently preferred embodiments of the invention that the vapor-grown carbon fibers exhibit an ability to dissipate static electric charge in the insulation. The volume and surface resistivities of insulation containing the vapor-grown carbon fibers were found to be much lower than those properties in conventional insulation.

The present invention also provides a carbon fiber-filled rocket motor insulation that can dissipate static charge, yet is free of asbestos.

In accordance with another aspect of this invention, a method of insulating a rocket motor is provided in which vapor-grown carbon fibers are dispersed in a composition comprising a crosslinkable polymer. The vapor-grown carbon fibers have an internal graphitized tube surrounded by a sheath of vapor-deposited amorphous carbon. The crosslinkable polymer is crosslinked to form a cured elastomeric insulation having the carbon fibers dispersed therein. Preferably, the dispersion of vapor-grown carbon fibers is substantially homogenous, meaning that the carbon fibers impart substantially uniform physical properties throughout the cured elastomer. The insulation can then be arranged internally in or externally on the rocket motor assembly for insulating or heat shielding. Parts that may be insulated by the novel insulation include the rocket motor casing and the nozzle assembly. The uncured composition may be applied directly to the rocket motor assembly, or may be cured prior to application to the rocket motor assembly.

Additional advantages of the invention will be set forth in the description that follows, and in part will be apparent from the description, or may be learned by practice of the invention. The advantages of the invention may be realized and obtained by means of the instrumentalities and combinations pointed out in the appended claims.

BRIEF DESCRIPTION OF THE SEVERAL VIEWS OF THE DRAWINGS

The accompanying drawings are incorporated in and constitute a part of the specification. The drawings, together with the general description given above and the detailed description of the preferred embodiments and methods given below, serve to explain the principles of the invention. In such drawings.

DETAILED DESCRIPTION OF THE INVENTION

It is to be noted that, as used in the specification and the appended claims, the singular forms "a," "an," and "the"

include plural referents unless the context clearly dictates otherwise. Thus, by way of example, the term "a crosslinkable polymer" includes in its definition not only a single crosslinkable polymer but also a combination of two or more polymers, for example. Also, the term "polymer" encompasses homopolymers, copolymers, and terpolymers. "Terpolymer" means a polymer made from three or more monomers.

As used herein, the term "rubber" is defined to encompass any elastomer including both synthetic and natural elastomers.

Figure 1A:
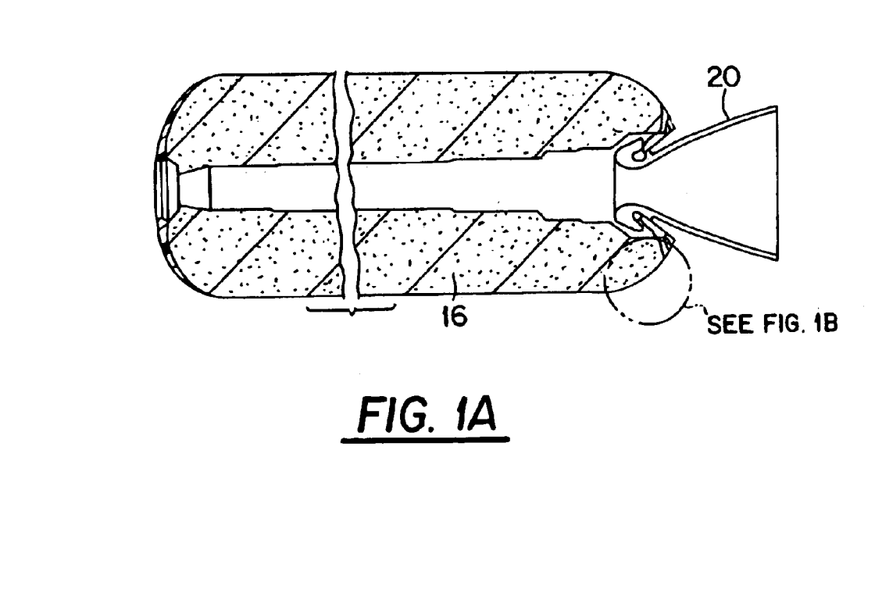
FIGS. 1A and 1B are views of a solid rocket motor equipped with insulation according to a presently preferred embodiment of the present invention.
Figure 1B:
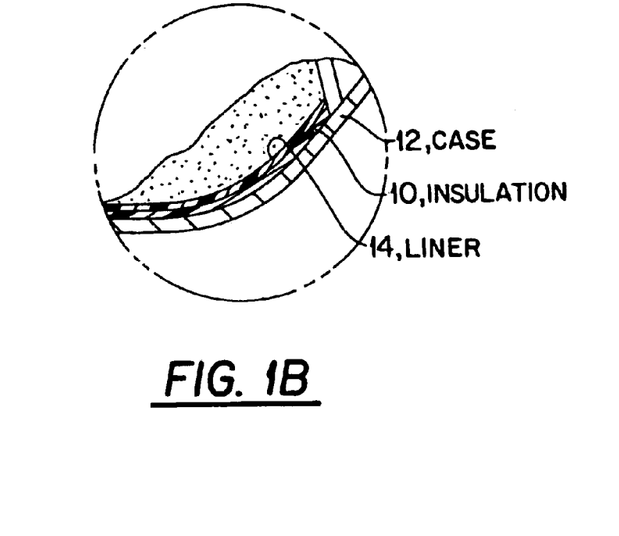

In accordance with one embodiment of the invention, there is shown in FIG. 1B an embodiment of the insulation 10 of this invention applied to the interior surface of a rocket motor casing 12. The solid propellant 16 illustrated in FIG. 1A is a center perforation propellant, although the invention is not thereby limited, since the insulation may be used with end-burning propellants and other propellant configurations. Typically, a liner 14 is interposed between the insulation 10 and the solid propellant 16, although the liner 14 may directly bond the propellant 16 to the casing 12. The insulation 10 and liner 14 serve to protect the casing 12 from the extreme conditions produced as the propellant 16 is burned. Methods for loading a rocket motor casing 12 with insulation 10, a liner 14, and propellant 16 are known to those skilled in the art and can be readily adapted with ordinary skill of the art to find use with the insulation of this invention. Nozzle 20 is operatively associated with the casing 12 to receive combustion products generated by combustion of the propellant 16 and to expel the combustion products, thus generating thrust to propel the rocket.

It should be understood that insulation according to the present invention may be applied, both internally and externally, at other regions of the rocket motor assembly. For example, it is believed that the insulation may permit for ablative protection of the external bulk of the case and nozzles. Although the insulation is well suited for use in insulating the interior of a solid rocket motor containing a solid propellant, it is envisioned that the insulation may also be used with other motors, such as biliquid, hybrid and reverse hybrid motors.

The insulation according to this embodiment of the invention is formed from a precursor composition comprising at least one crosslinkable polymer. Suitable crosslinkable polymers include EPDM terpolymer, polybutadiene, polyisoprene, poly(acrylonitrile-co-butadiene), and precursors for natural rubber. Various mixtures, combinations, copolymers, terpolymers, and blends of these polymers are also included in the scope of this invention.

EPDM is preferred because of its low density and superior ablative properties. Examples of suitable EPDM polymers include NORDEL® IP NDR-4520 and NORDEL® IP NDR-4640, commercially available from E.I. DuPont de Nemours and Company, each of which are believed to have an ethylene content in the range of 50% to 55% by weight. Blends of EPDM terpolymers having the same or different ethylene contents can also be used. The diene component of the EPDM can be, for example, 1,4-hexadiene or ethylidene norbornene. The remaining propylene content may include traces of certain dienes used to produce branching in the molecular structure.

The crosslinkable polymer generally may constitute, for example, from about 55 weight percent to about 70 weight percent of the total weight of the composition, i.e., the mass of the insulation. Precured compositions having crosslinkable polymer concentrations lower than about 55 weight percent may possess high viscosities that complicate processing by increasing shear requirements during mixing. As shear increases, so does heat generation, which may cause scorching of the composition. On the other hand, practicing more than about 70 weight percent crosslinkable polymer may dilute the carbon fiber proportion to negate or diminish the beneficial properties otherwise conferred by the fibers.

The cure package preferably contains a sulfur-curing agent. Elemental sulfur can be used as the curing agent. An example of elemental sulfur is laccofine sulfur, manufactured by S.F. Sulfur Corp. A suitable sulfur-curing agent is a polymer-predispersed sulfur, such as AKROSPERSE® IS-70 from Akrochem Corporation. Suitable cure activators for use with the sulfur-curing agent are metal oxides, such as zinc oxide and magnesium oxide (e.g., ELASTOMAG® 170, from Morton Chemical Co.). Cure accelerators can also be used. Representative cure accelerators include butyl zimate (zinc di-n-butyldithiol carbamate), benzothiazol disulfide (commercially known as ALTAX® from R.T. Vanderbilt Company, Inc.), and sulfides, such as dipentamethylenethiuram hexasulfide (such as SULFADS® from R.T. Vanderbilt Company, Inc.). It is also possible to use phosphate accelerators, such as those available from Rhein-Chemie Reinau GMBH (RHENOCURE®) and Akrochem Corporation (e.g., ACCELERATOR VS).

Other cure packages can be used within the scope of this invention, including those with peroxide activators.

The proportional amounts of each of the cure agents, activators, and accelerators depend upon various factors, including the parts by weight of polymer, the polymer selected, and the constituents of the cure package. Generally, elemental sulfur is recommended for use at 0.5 to 1.5 phr. ALTAX® and its functional equivalents used as the primary cure accelerator may be present in an amount of 0.5 to 1.5 phr. As an ultra-accelerator, butyl zimate may be present in an amount of 1.5 to 3 phr. When used as a secondary accelerator, SULFADS® and its functional equivalents may be present in an amount of 0.1 to 1 phr. Zinc oxide is an activator that may be present in an amount of 2 to 5 phr.

As referred to herein and generally accepted in the art, "phr" means parts by weight per one hundred parts by weight polymer.

Vapor-grown carbon fibers (VGCF) are typically produced from carbonaceous compounds, such as, for example, methane, in a gas phase reaction upon contact with catalytic metal particles.

U.S. Pat. No. 5,024,818 to Tibbetts et al. and U.S. Pat. Nos. 5,374,415 and 5,594,060 to Alig et al. describe typical reaction processes and conditions for making vapor-grown carbon fibers. An example of a suitable metal for use as the catalytic metal particles for making the vapor-grown carbon fibers is iron or iron pentacarbonyl. The gaseous carbonaceous compound can be one or more gases selected from the group consisting of methane, ethane, propane, ethylene, acetylene, natural gas, carbon dioxide, carbon monoxide, and vaporizable hydrocarbons. The gaseous reactant stream may be moved through the reactor at a velocity sufficient to entrain and suspend the catalytic metal particles. The mixture of the carbonaceous compound and catalytic metal particles is heated in a reactor for a time and at a temperature sufficient to induce growth of carbon fibers on the particles, thereby forming the carbon fibers. Temperatures on the order of 1100° C. are often sufficient to induce the catalytic fiber growth. While not wishing to be bound to any theory, it is believed that the carbon is absorbed into the catalyst and then precipitates out one side, integrating itself into a fine filament of carbon with a diameter approximately equal to that of the catalyst particle.

In addition to the carbonaceous compound, other gases may be present. The use of ammonia and an air purge provides a surface treatment for the vapor-grown carbon fiber. While not wishing to be bound by any theory, it is believed that the ammonia gas in the reactor deposits active nitrogen groups on the carbon fiber surface. It is further believed that the nitrogen and oxygen groups on the fiber surface enhance the ability of the fiber surface to wet-out and form bonds with other materials.

A forced purge step may immediately follow the period of fiber formation. Pressurized gas such as air, helium, nitrogen, or argon may be supplied for the purge step. When air is selected for the forced purge, the air also acts to oxidize any carbonaceous residue in the reactor. When a nonoxygen-containing gas is used for the forced purge, an oxidation purge may follow. By making the air purge intermittent, the oxidative treatment is not excessive to the point where etching or pitting of the carbon fiber surface occurs to any substantial amount.

A sulfur-containing gaseous compound can also be present in the reactor during catalytic growth of the carbon fiber. Hydrogen sulfide may enhance fiber growth from the iron catalyst and will remain in the fiber.

The final structure of each of the carbon fibers is a graphitic hollow tube surrounded by chemical vapor-deposited carbon. The graphitization index of the carbon fiber is the weight percent of the carbon fiber that consists of graphite. It is believed that this aspect of the invention may be practiced over a wide range of graphitization indexes, including from about 30 to about 65 or even higher.

A currently preferred carbon fiber is PYROGRAPH-III™ fiber, available from Applied Sciences, Inc.

The vapor-grown carbon fibers used in presently preferred embodiments of this invention preferably have (on average) a diameter in a range of about 0.1 micron to about 0.8 micron, more preferably about 0.2 micron, and (on average) a length of about 50 microns to 200 microns. These dimensions make the carbon fibers of the preferred inventive formulation smaller than conventional continuous or milled carbon fibers, which measure 5 to 10 microns in diameter, but larger than carbon nanotubes, which measure 0.005 to 0.015 micron in diameter.

The amount of carbon fibers loaded into the insulation can be varied to tailor mechanical and ablative properties. Generally, however, not more than about 30 weight percent of the total mass of the insulation should consist of vapor-grown carbon fibers. It is generally desirable for the carbon fibers to constitute at least 10 weight percent of the total weight of the insulation, more preferably at least 15 weight percent.

The carbon fibers can be used alone or in combination with other materials affecting the ablative and mechanical properties of the insulation. By way of example, suitable materials include conventional carbon fibers, polybenzoxazole fibers, polybenzimidazole fibers, aramide fibers, milled glass, silica, ceramic clay, talc, and the like.

Suitable additives that may be included in the composition as required or desired include one or more of the following, in various combinations: secondary polymers, plasticizers, tackifiers, antioxidants, flame retardants, plasticizers, processing aids, carbon black, pigments, bonding agents, other mineral fillers and the like.

Adhesion-promoting secondary polymers that may also be used in the formulation include elastomer modifiers, especially polar polymers. Among suitable secondary polymers are chlorosulfonated polyethylene, such as HYPALON® 20 from E.I. Dupont de Nemours and Company, and polychloroprene. Polychloroprene polymers are available from DuPont Dow under tradenames NEOPRENE FB, NEOPRENE TW, and NEOPRENE GRT.

An exemplary plasticizer for the inventive formulation is the EPDM-based TRILENE® 67A (Uniroyal Chemical Company).

Tackifiers may also optionally be used. Examples of suitable tackifiers are AKROCHEM® P-133 made by Akron Chemical Company and WINGTACK® 95 made by Goodyear Tire & Rubber Company.

One or more antioxidants may also be included in embodiments of the inventive formulation. Preferred antioxidants include polymerized 1,2-dihydro-2,2,4-trimethylquinoline (AGERITE RESIN D) and mixed octylated diphenylamines (AGERITE STALITE S), each of which is available from R.T. Vanderbilt Co.

The carbon fibers serve the additional function of flame retardant. However, further flame retardants can also be added to the composition. Both inorganic and organic flame retardants are expected to be useful in the present invention. An example of an organic flame retardant is chlorinated hydrocarbon, available as DECHLORANE® from Occidental Chemical Corp., in combination with antimony oxide or hydrated alumina. Examples of inorganic flame retardants are phosphates and phosphate derivatives, available as PHOSCHEK P/30®, produced by Solutia, Inc.

Insulation according to this invention can be prepared in conventional rubber mixing equipment. Unlike conventional techniques that make use of solvent within a mixing apparatus to achieve adequate distribution of carbon fibers in the polymeric binder without significant fiber fragmentation, in a preferred embodiment of this invention, the carbon fibers can be distributed under solvent-free conditions, or at least substantially solvent-free conditions. As referred to herein, "substantially solvent-free" means that the process is performed with a sufficiently small amount of volatile solvent that, even if the volatile solvent is not removed during manufacture of the insulation, the volatile solvent will not be present in a sufficient amount to violate applicable environmental or safety regulations during manufacture, storage, or operation of the rocket motor. Generally, the term "substantially solvent-free" preferably means not more than about 5 weight percent of volatile solvent based on the dry ingredients of the insulation. Preferably, the process is conducted completely free of volatile solvent.

The application of the inventive insulation into a case and curing of the insulation may be performed in accordance with techniques known in the art. As referred to herein and in the appended claims, embodiments of the inventive composition can be, inter alia, applied as an uncured insulation precursor into a rocket motor cases then cured, or applied (and optionally cut into appropriate geometry and size) as a cured insulation in or on the rocket motor assembly, such as in the rocket motor case. Likewise, the rocket motor casing can be built around the cured insulation by, for example, filament winding over a mandrel sheathed with the insulation.

Insulation according to embodiments of this invention can exhibit an excellent ability to dissipate static charge. It has been found that embodiments of the inventive insulation may exhibit resistivities four to five orders of magnitude lower compared to resistivities of silica-filled insulation. Preferably, the volume resistivity of these embodiments is in a range of from $5 \times 10^9$ to $5 \times 10^{14}$ Ohms·cm, more preferably in a range of $5 \times 10^9$ to $1 \times 10^{12}$ Ohms·cm. As reported and claimed herein, volume resistivity is measured by ASTM D-257.

The following examples illustrate embodiments that have been made in accordance with the present invention. Also set forth are comparative examples prepared for comparison purposes. The inventive embodiments are not exhaustive or exclusive, but merely representative of the many types of embodiments that may be prepared according to the invention.

EXAMPLES

Example 1 and Comparative Example A were each prepared by a two-pass mix cycle. In the first pass, all of the ingredients except for the cure activator, cure accelerator, and curative were added to a mixer and mixed for several minutes. Example 1 was heated to 116° C. (240° F.). Comparative Example A was heated to 135° C. (275° F.). A mill was used to sheet the mixtures, and the sheets were allowed to cool. The cooled mixtures were then returned to the mixer, and the cure packages were added. Mixing continued until the temperature reached about 80° C. (175° F.) for Example 1 and 82° C. (180° F.) for Comparative Example A. The mixture was then sheeted and allowed to cool.

TABLE I

| Ingredient | Function | Example 1 | Comparative Example A |
|---|---|---|---|
| NORDEL ® IP NDR-4640 | EPDM | 50.00 | 50.00 |
| NORDEL ® IP NDR-4520 | EPDM | 40.00 | 40.00 |
| HYPALON ® 20 | Chlorosulfonated polyethylene | 10.00 | 10.00 |
| AKROCHEM ® P-133 | Tackifier | 5.00 | 5.00 |
| Agerite Stalite S | Antioxidant | 2.00 | 2.00 |
| Hi-Sil 233 | Amorphous, precipitated silica | — | 35.50 |
| Pyrograf-III | Carbon fiber | 35.50 | — |
| HAF carbon black | Additive | 0.50 | 0.50 |
| Kadox 930 zinc oxide | Cure activator | 4.00 | 4.00 |
| Elastomag 170 | Cure activator | 0.50 | 0.50 |
| Altax | Cure accelerator | 1.50 | 1.50 |
| Sulfads | Cure accelerator | 0.30 | 0.30 |
| Butyl Zimate | Cure accelerator | 1.50 | 1.50 |
| Sulfur | Curative | 0.50 | 0.50 |
| Total Weight | | 151.30 | 151.30 |

TABLE 2

| Property | Example 1 | Comparative Example A |
|---|---|---|
| Density (g/cm³) | 1.063 | 1.070 |
| Ash content (%) | 3.42 | 24.2 |
| Shore A hardness | 83.4 | 70.4 |
| Tensile strength parallel (psi) | 1620 | 2210 |
| Elongation parallel (%) | 159 | 538 |
| 100% modulus parallel (psi) | 1508 | 344 |
| Tensile strength, perpendicular (psi) | 1210 | — |
| Elongation, perpendicular (%) | 233 | — |
| 100% modulus, perpendicular (psi) | 962 | — |
| Tear resistance (pli) | 311 | 228 |

Density and Shore A hardness were determined by ASTM D792 and ASTM D2240, respectively. Elongation and tensile strength were each determined by ASTM D412. Tear resistance was determined by ASTM D624. It was found that the inventive formulation of Example 1 satisfied the following minimum conditions: elongation (perpendicular and parallel) of greater than 30%, tensile strength (parallel) of greater than 1000 psi, and tear resistance of greater than 170 pli. The superior properties of the Example 1 composition are considered excellent for fiber-filled insulation of a rocket motor. The parallel and perpendicular data for Example 1 exhibited the anisotropy characteristic of a fiber-filled material in which there is significant orientation of the fibers.

Figure 2:
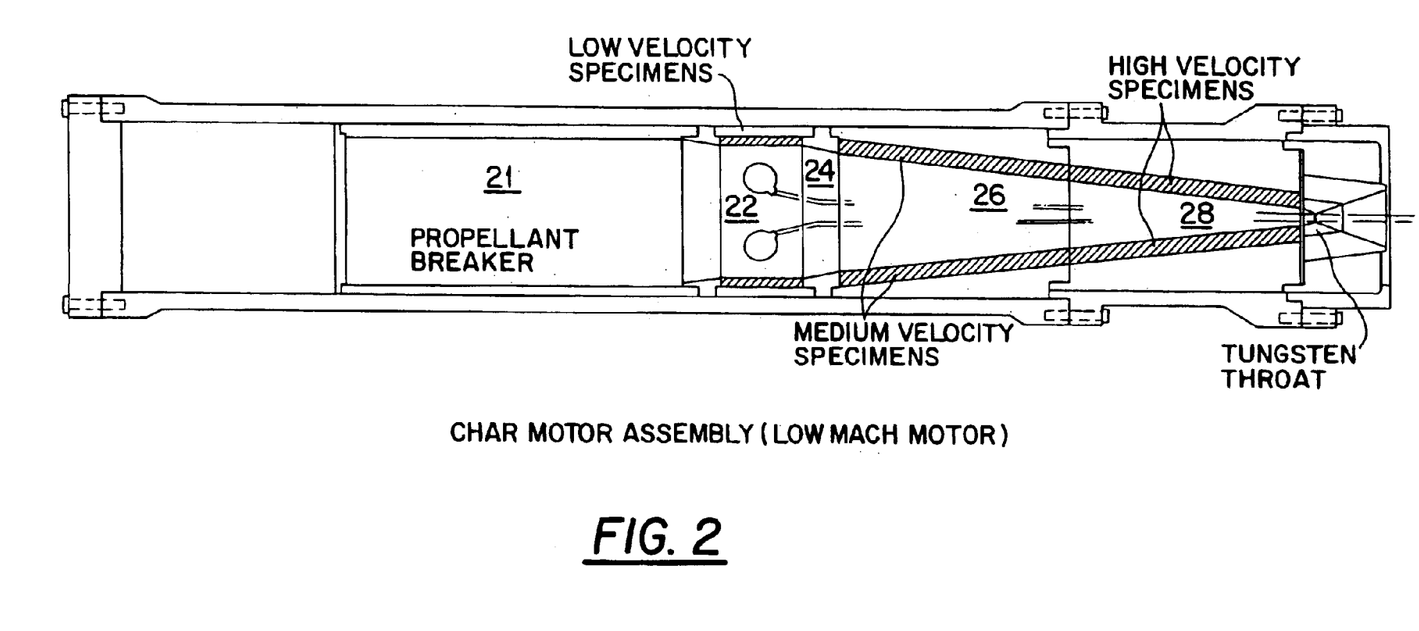
FIG. 2 is a side sectional view of a test char motor.

Ablative tests were performed in a char motor, such as the one illustrated in FIG. 2. Char motors are constructed to evaluate the ablative properties of solid rocket motor case insulating materials. A char motor includes a propellant beaker 21 to provide the combustion gases, evaluation chambers to hold the test materials, and a constricting nozzle to produce the required pressure. The char motors were fired with RSRM TP-H1148 (polybutadieneacrylic acid acrylonitrile (PBAN)) propellant. The evaluation chamber is divided into three sections. The first one is a "low velocity" cylindrical region 22 about eight inches long and eight inches in diameter (approximately the same diameter as the propellant beaker). A short conical transition chamber 24 slightly constricts the gas flow pathway from 4 inches to 3.97 inches in radius and vents the propellant gases into a 22 inch long conical test chamber. The test chamber is divided into the "middle velocity" region 26 and the "high velocity" region 28. The test chamber tapers over regions 26 and 28 to constrict the diameter of the gas flow pathway from 3.97 inches to 1.56 inches in radius. The measurement points extend from the axial locations 0.5 to 3.5 inches, 5.6 to 15.23 inches, and 16.6 to 26.3 inches for the three velocity sections.

Samples of insulation material to be evaluated were molded, cured, and bonded with epoxy into each of the test chambers. Prior to assembly, the cured length was determined and the thickness of each evaluation material was measured at selected intervals, nominally one inch apart. Each sample was also weighed. The samples were then assembled into the low velocity section, the middle velocity section, and the high velocity section. After firing, the motor was disassembled, and each sample was measured again. The ablation rate was determined by subtracting the post-fired thickness of virgin insulation (i.e., after the char had been removed) at a given point from the prefired thickness and dividing the result by the burn time of the motor.

Figure 3:
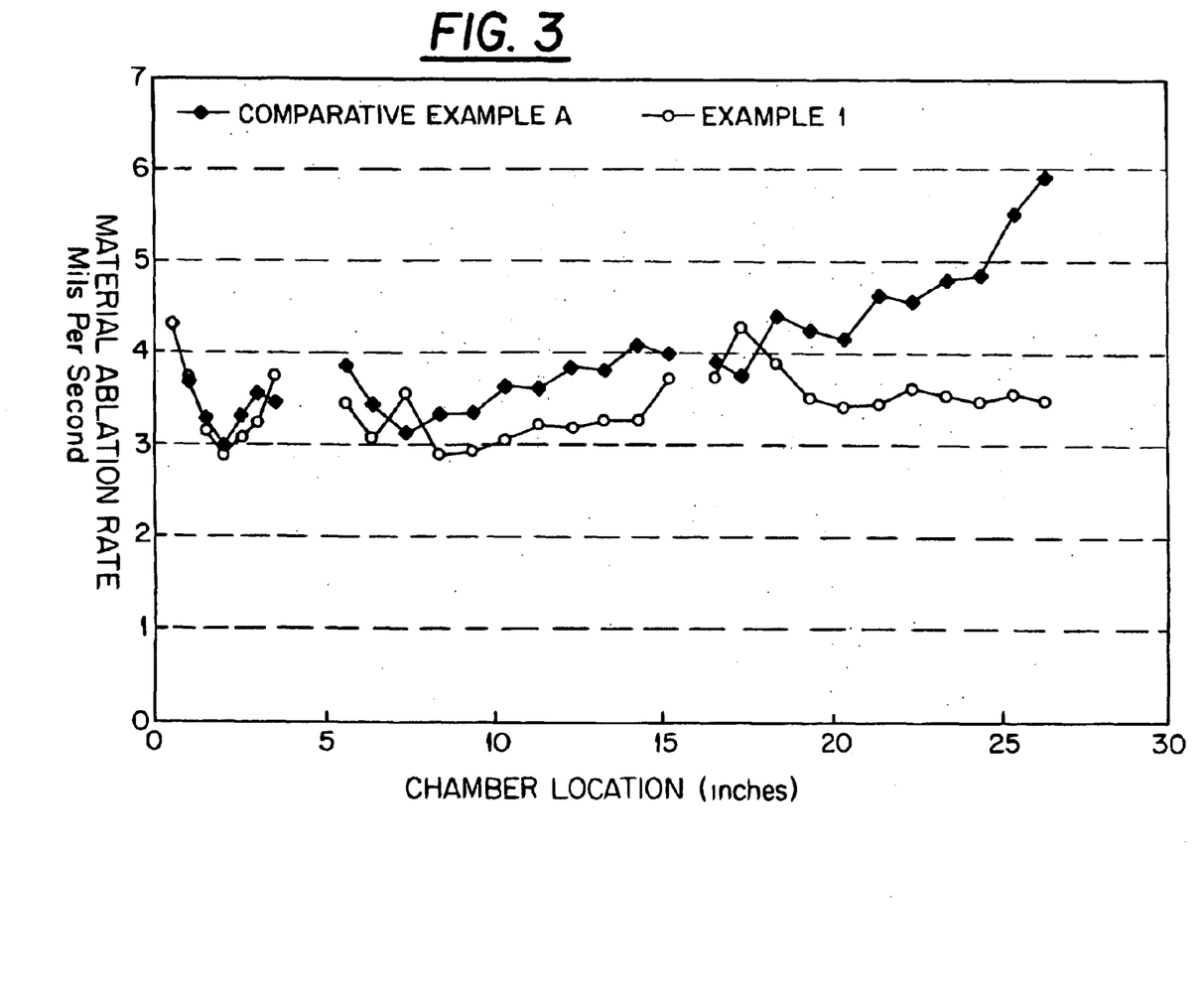
FIG. 3 is a graph showing the material ablation rates for an inventive insulation formulation according to another preferred embodiment of the invention and a comparative insulation formulation.

The firing time was 29.6 seconds, at an average pressure of 937 psi. The material ablation rate data is shown in FIG. 3.

The average material ablation rate (MAR) values for Example 1 and Comparative Example A in the low velocity region 22 were 3.44 and 3.51 mils/second, respectively. The corresponding numbers for the middle velocity region 26 were 3.23 and 3.63 mils/second. In the high velocity region 28, the Comparative Example A showed much greater sensitivity to axial location (gas velocity). That is, Example 1 exhibited much less ablation as the gas velocity increased.

The foregoing description of the invention has been provided for the purpose of explaining the principles of the invention and its practical application, thereby enabling others skilled in the art to understand the invention for various embodiments and with various modifications as are suited for the particular use contemplated. The foregoing detailed description is not intended to be exhaustive or to limit the invention to the precise embodiments disclosed. Modifications and equivalents will be apparent to practitioners skilled in the art and are encompassed within the spirit and scope of the appended claims.

What is claimed is:

1. An insulating material for a rocket motor that consists essentially of at least one cured elastomer, vapor-grown carbon fibers, at least one secondary polymer, at least one tackifier, at least one antioxidant, carbon black, at least one cure activator, at least one cure accelerator, and at least one cure agent.

2. The insulating material of claim 1, wherein the vapor-grown carbon fibers have an average diameter of from about 0.1 micron to about 0.8 micron.

3. The insulating material of claim 2, wherein the average diameter of the vapor-grown carbon fibers is about 0.2 micron.

4. The insulating material of claim 1, wherein the vapor-grown carbon fibers have an average length of from about 50 microns to about 200 microns.

5. The insulating material of claim 1, wherein the at least one cured elastomer is formed from a precursor composition comprising at least one crosslinkable polymer.

6. The insulating material of claim 5, wherein the at least one crosslinkable polymer comprises between about 55 weight percent and about 70 weight percent of a total weight of the insulating material.

7. The insulating material of claim 5, wherein the at least one crosslinkable polymer is selected from the group consisting of an EPDM terpolymer, polybutadiene, polyisoprene, poly(acrylonitrile-co-butadiene), a precursor of natural rubber, and mixtures, combinations, copolymers, terpolymers, or blends thereof.

8. The insulating material of claim 1, wherein the at least one cure agent comprises a sulfur-containing cure agent.

9. The insulating material of claim 1, wherein the insulating material is formulated to have a perpendicular and a parallel elongation of greater than 30%, a parallel tensile strength of greater than 1000 psi, and a tear resistance of greater than 170 pli.

10. The insulating material of claim 1, wherein the insulating material is formulated to have a volume resistivity between about $5\times10^9$ and $5\times10^{14}$ Ohms·cm.

11. The insulating material of claim 1, wherein the vapor-grown carbon fibers have a graphitization index of from about 30 weight percent to about 65 weight percent.

12. The insulating material of claim 1, wherein the vapor-grown carbon fibers comprise not more than 30 weight percent of a total weight of the insulating material.

13. The insulating material of claim 1, wherein the vapor-grown carbon fibers comprise at least 10 weight percent of a total weight of the insulating material.

14. The insulating material of claim 1, further including at least one of at least one plasticizer, at least one processing aid, at least one pigment, at least one bonding agent, carbon fibers, polybenzoxazole fibers, polybenzimidazole fibers, aramide fibers, ceramic clay, and talc.

15. A method for making an insulating material for a rocket motor, comprising:
providing a composition that consists essentially of at least one crosslinkable polymer, vapor-grown carbon fibers, at least one secondary polymer, at least one tackifier, at least one antioxidant, carbon black, at least one cure activator, at least one cure accelerator, and at least one cure agent;
dispersing the vapor-grown carbon fibers in the at least one crosslinkable polymer; and
crosslinking the at least one crosslinkable polymer to form a cured elastomeric insulating material having the vapor-grown carbon fibers dispersed therein.

16. The method of claim 15, wherein dispersing the vapor-grown carbon fibers in the at least one crosslinkable polymer comprises dispersing vapor-grown carbon fibers having an average diameter of from about 0.1 micron to about 0.8 micron in the at least one crosslinkable polymer.

17. The method of claim 16, wherein dispersing vapor-grown carbon fibers having an average diameter of from about 0.1 micron to about 0.8 micron in the at least one crosslinkable polymer comprises dispersing vapor-grown carbon fibers having an average diameter of about 0.2 micron in the at least one crosslinkable polymer.

18. The method of claim 15, wherein dispersing the vapor-grown carbon fibers in the at least one crosslinkable polymer comprises dispersing vapor-grown carbon fibers having an average length of between about 50 microns and about 200 microns in the at least one crosslinkable polymer.

19. The method of claim 15, wherein providing a composition that consists essentially of at least one crosslinkable polymer, vapor-grown carbon fibers, at least one secondary polymer, at least one tackifier, at least one antioxidant, carbon black, at least one cure activator, at least one cure accelerator, and at least one cure agent comprises providing a composition comprising at least one crosslinkable polymer selected from the group consisting of an EPDM terpolymer, polybutadiene, polyisoprene, poly(acrylonitrile-co-butadiene), a precursor of natural rubber, and mixtures, combinations, copolymers, terpolymers, or blends thereof.

20. The method of claim 15, wherein providing a composition that consists essentially of at least one crosslinkable polymer, vapor-grown carbon fibers, at least one secondary polymer, at least one tackifier, at least one antioxidant, carbon black, at least one cure activator, at least one cure accelerator, and at least one cure agent comprises providing a composition including the at least one crosslinkable polymer, the vapor-grown carbon fibers and a sulfur-containing cure agent.

21. The method of claim 15, wherein crosslinking the at least one crosslinkable polymer to form a cured elastomeric insulating material comprises crosslinking the at least one crosslinkable polymer to form a cured elastomeric insulating material formulated to have a volume resistivity between about $5\times10^9$ and $5\times10^{14}$ Ohms·cm.

22. The method of claim 15, wherein crosslinking the at least one crosslinkable polymer to form a cured elastomeric insulating material comprises crosslinking the at least one crosslinkable polymer to form a cured elastomeric insulating material having a perpendicular and a parallel elongation of greater than 30%, a parallel tensile strength of greater than 1000 psi, and a tear resistance of greater than 170 pli.

23. The method of claim 15, wherein dispersing the vapor-grown carbon fibers in the at least one crosslinkable polymer comprises dispersing the vapor-grown carbon fibers under substantially solvent-free conditions.

24. The method of claim 15, wherein dispersing the vapor-grown carbon fibers in the at least one crosslinkable polymer comprises dispersing the vapor-grown carbon fibers in the absence of an organic solvent.

25. The method of claim 15, wherein dispersing the vapor-grown carbon fibers in the at least one crosslinkable polymer comprises substantially homogeneously dispersing the vapor-grown carbon fibers in the at least one crosslinkable polymer.

26. The method of claim 15, wherein providing a composition that consists essentially of at least one crosslinkable polymer, vapor-grown carbon fibers, at least one secondary polymer, at least one tackifier, at least one antioxidant, carbon black, at least one cure activator, at least one cure accelerator, and at least one cure agent comprises providing a composition that comprises at least 10 weight percent of the vapor-grown carbon fibers in a total weight of the cured elastomeric insulating material.

27. The method of claim 15, wherein providing a composition that consists essentially of at least one crosslinkable polymer, vapor-grown carbon fibers, at least one secondary polymer, at least one tackifier, at least one antioxidant, carbon black, at least one cure activator, at least one cure accelerator, and at least one cure agent comprises providing a composition that comprises not more than 30 weight percent of the vapor-grown carbon fibers in a total weight of the cured elastomeric insulating material.

28. The method of claim 15, wherein providing a composition that consists essentially of at least one crosslinkable polymer, vapor-grown carbon fibers, at least one secondary polymer, at least one tackifier, at least one antioxidant, carbon black, at least one cure activator, at least one cure accelerator, and at least one cure agent comprises providing the compostion that further includes at least one of at least one plasticizer, at least one processing aid, at least one pigment, at least one bonding agent, carbon fibers, polybenzoxazole fibers, polybenzimidazole fibers, aramide fibers, ceramic clay, and talc.

* * * * *

UNITED STATES PATENT AND TRADEMARK OFFICE
CERTIFICATE OF CORRECTION

| | | |
|---|---|---|
| PATENT NO. | : 7,070,705 B2 | Page 1 of 1 |
| APPLICATION NO. | : 10/772877 | |
| DATED | : July 4, 2006 | |
| INVENTOR(S) | : Albert R. Harvey and John W. Ellertson | |

It is certified that error appears in the above-identified patent and that said Letters Patent is hereby corrected as shown below:

COLUMN 7, LINE 64, at the beginning of the line delete "plasticizers,"

COLUMN 8, LINE 55, change "a rocket motor cases" to --a rocket motor case,--

Signed and Sealed this

Thirtieth Day of December, 2008

JON W. DUDAS
*Director of the United States Patent and Trademark Office*